(12) United States Patent
Miller et al.

(10) Patent No.: US 7,667,045 B2
(45) Date of Patent: Feb. 23, 2010

(54) GAS GENERANT AND SYNTHESIS

(75) Inventors: Cory G. Miller, Rochester, MI (US); Graylon K. Williams, Warren, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 482 days.

(21) Appl. No.: 11/143,198

(22) Filed: Jun. 1, 2005

(65) Prior Publication Data

US 2005/0272873 A1 Dec. 8, 2005

Related U.S. Application Data

(60) Provisional application No. 60/576,769, filed on Jun. 2, 2004.

(51) Int. Cl.
*C07D 257/00* (2006.01)
(52) U.S. Cl. .................................... 548/250
(58) Field of Classification Search ................ 548/250
See application file for complete search history.

(56) References Cited

U.S. PATENT DOCUMENTS

| | | | |
|---|---|---|---|
| 3,096,312 A * | 7/1963 | Henry .................... 525/326.7 |
| 4,370,181 A | 1/1983 | Lundstorm et al. ............. 149/2 |
| 4,558,832 A | 12/1985 | Nilsson ..................... 242/374 |
| 4,597,546 A | 7/1986 | Yamamoto et al. ........ 242/382.2 |
| 4,909,549 A | 3/1990 | Poole et al. ................. 280/738 |
| 4,948,439 A | 8/1990 | Poole et al. .................... 149/46 |
| 5,035,757 A | 7/1991 | Poole .......................... 149/46 |
| 5,084,118 A | 1/1992 | Poole .......................... 149/22 |
| 5,139,588 A | 8/1992 | Poole .......................... 149/61 |
| 5,451,008 A | 9/1995 | Hamaue ..................... 242/374 |
| 5,553,803 A | 9/1996 | Mitzkus et al. .............. 242/374 |
| 5,667,161 A | 9/1997 | Mitzkus et al. .............. 242/374 |
| 5,811,725 A | 9/1998 | Klager |
| 5,872,329 A | 2/1999 | Burns et al. ................... 149/36 |
| 6,074,502 A | 6/2000 | Burns et al. ................... 149/36 |
| 6,210,505 B1 | 4/2001 | Khandhadia et al. .......... 149/36 |
| 6,306,232 B1 | 10/2001 | Khandhadia et al. .......... 149/22 |
| 6,419,177 B2 | 7/2002 | Stevens ...................... 242/374 |
| 6,422,601 B1 | 7/2002 | Quioc ........................ 280/741 |
| 6,505,790 B2 | 1/2003 | Stevens ...................... 242/374 |
| 6,659,500 B2 | 12/2003 | Whang et al. ............... 280/741 |
| 6,749,219 B2 | 6/2004 | Edwards, II et al. ......... 280/741 |
| 6,752,421 B2 | 6/2004 | Khandhadia et al. ........ 280/741 |

OTHER PUBLICATIONS

Office Action U.S. Appl. No. 11/264,983, filed Nov. 1, 2005 dated for Nov. 28, 2007.
Office Action U.S. Appl. No. 11/264,983, filed Nov. 1, 2005 dated for Aug. 8, 2007.
Office Action U.S. Appl. No. 11/264,983, filed Nov. 1, 2005 dated for Jul. 11, 2007.
Office Action U.S. Appl. No. 11/497,148, filed Jul. 31, 2006 dated for Apr. 8, 2008.
Office Action U.S. Appl. No. 11/497,148, filed Jul. 31, 2006 dated for Nov. 9, 2007.
Office Action U.S. Appl. No. 11/497,148, filed Jul. 31, 2006 dated for Aug. 16, 2007.
Office Action U.S. Appl. No. 11/264,982, filed Nov. 1, 2005 dated for Oct. 2, 2007.
Office Action for U.S. Appl. No. 11/264,982, filed Nov. 1, 2005 mailed Apr. 30, 2008.
Office Action U.S. Appl. No. 11/164,982, filed Nov. 1, 2005, Dated for Apr. 15, 2009 (100).
Office Action U.S. Appl. No. 10/964,052, filed Oct. 12, 2004, Dated for Nov. 28, 2007 (48).
Office Action U.S. Appl. No. 11/497,148, filed Jul. 31, 2006, Dated for Nov. 5, 2008 (127).
Office Action U.S. Appl. No. 11/497,148, filed Jul. 31, 2006, Dated for Mar. 4, 2009 (127).

* cited by examiner

*Primary Examiner*—Golam M. M. Shameem
*Assistant Examiner*—Susannah Chung
(74) *Attorney, Agent, or Firm*—L.C. Begin & Associates, PLLC.

(57) ABSTRACT

A vinylated tetrazole substituted at the 5-position of the tetrazole ring is formed by a water-based method. A gas generating composition 12 containing the vinylated tetrazole is contained within an exemplary gas generator 10. A gas generating system 200 incorporates the vinylated tetrazole therein. A vehicle occupant protection system 180 incorporates the gas generating system 200.

14 Claims, 2 Drawing Sheets

GAS GENERANT AND SYNTHESIS

CROSS REFERENCE TO RELATED APPLICATIONS

The present application claims the benefit of U.S. Provisional Application Ser. No. 60/576,769 filed on Jun. 2, 2004.

BACKGROUND

Typically, polymeric compounds are useful in synthesizing polymeric fuels and/or binders. The manufacturing process often includes the use of organic solvents such as those described in U.S. Pat. No. 3,096,312, herein incorporated by reference. From an environmental standpoint, the use of organic solvents complicates the ecological impact of the waste stream. Furthermore, the organic polymer work-up procedure is relatively long and complicated. The polymer is generally precipitated by draining the organic solvent into water. Accordingly, due to environmental considerations, the organic procedure requires that the solvent be distilled from the mixture thereby requiring higher energy and higher temperatures. Alternatively, the solvent may be disposed of mixed with the water. This alternative however is costly given that the whole slurry is considered waste. As such, known methods of manufacturing the polymers used to synthesize the fuels and/or binders might be improved upon by providing a water-based synthesis. A water-based process of manufacturing the polymers would thereby provide a safer synthesis by reducing the volatile organic compounds liberated during the synthesis, and would also reduce the environmental impact of the waste from the synthesis given the absence or reduction of organic solvents in the synthesis.

SUMMARY

An improved process of synthesizing a polymeric binder and/or fuel obviates the need for an organic solvent during the manufacturing process. The present synthesis is water-based, and therefore contains a first step of filtration from water, and filtration from acidic water in the next step. No distillation or high energy costs are required. More particularly, a process describing the synthesis of poly(5-vinyltetrazole) is described. The reaction given below illustrates a preferred embodiment of the method of making a tetrazole-containing polymer, substituted at the 5-position as shown. However, it is believed that any polymer containing a nitrile group may be employed as a starting polymer in accordance with the reaction given below, thereby resulting in a polymeric product having a tetrazole ring as a group.

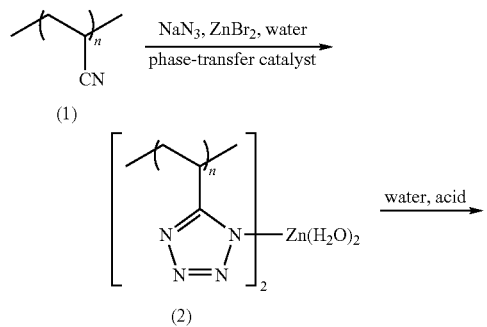

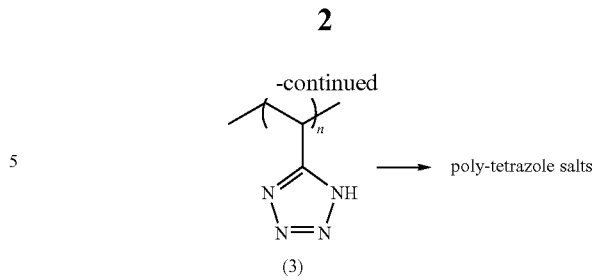

The reaction may be described as an improved water-based [2+3] cycloaddition of poly(5-vinyltetrazole) using various surfactants as an emulsifying agent. As shown above, the preferred reactive polymer is poly(acrylonitrile) although it is believed that other polymers containing a nitrile group may also provide the same benefit. That is, other nitrile polymers may also be employed as the reactive polymer to produce a polymeric product containing a tetrazole group. With reference to the above reaction, the reactive polymer is provided in a molar equivalents range of 1.0 to 1.5. An azide salt, or a salt having an azide group is mixed with the nitrile polymer. Accordingly, sodium azide is preferably provided in a 1.1 to 1.5 molar equivalents range. Furthermore, a catalytic reagent such as zinc bromide is also provided in a molar equivalents range of about 0.5 to 1.5. Finally, a surfactant such as ammonium lauryl sulfate or other nonmetal surfactants, sodium lauryl sulfate or other metal surfactants, dial soap, dawn dishwashing detergents, or other known surfactants or dispersants, and mixtures thereof are preferably provided in a molar equivalents range of 0.005 to 0.05. It will be appreciated that the above-referenced molar amounts are preferred ranges only, and therefore other effective amounts of each constituent may be employed.

DETAILED DESCRIPTION OF THE INVENTION

Figure 1:
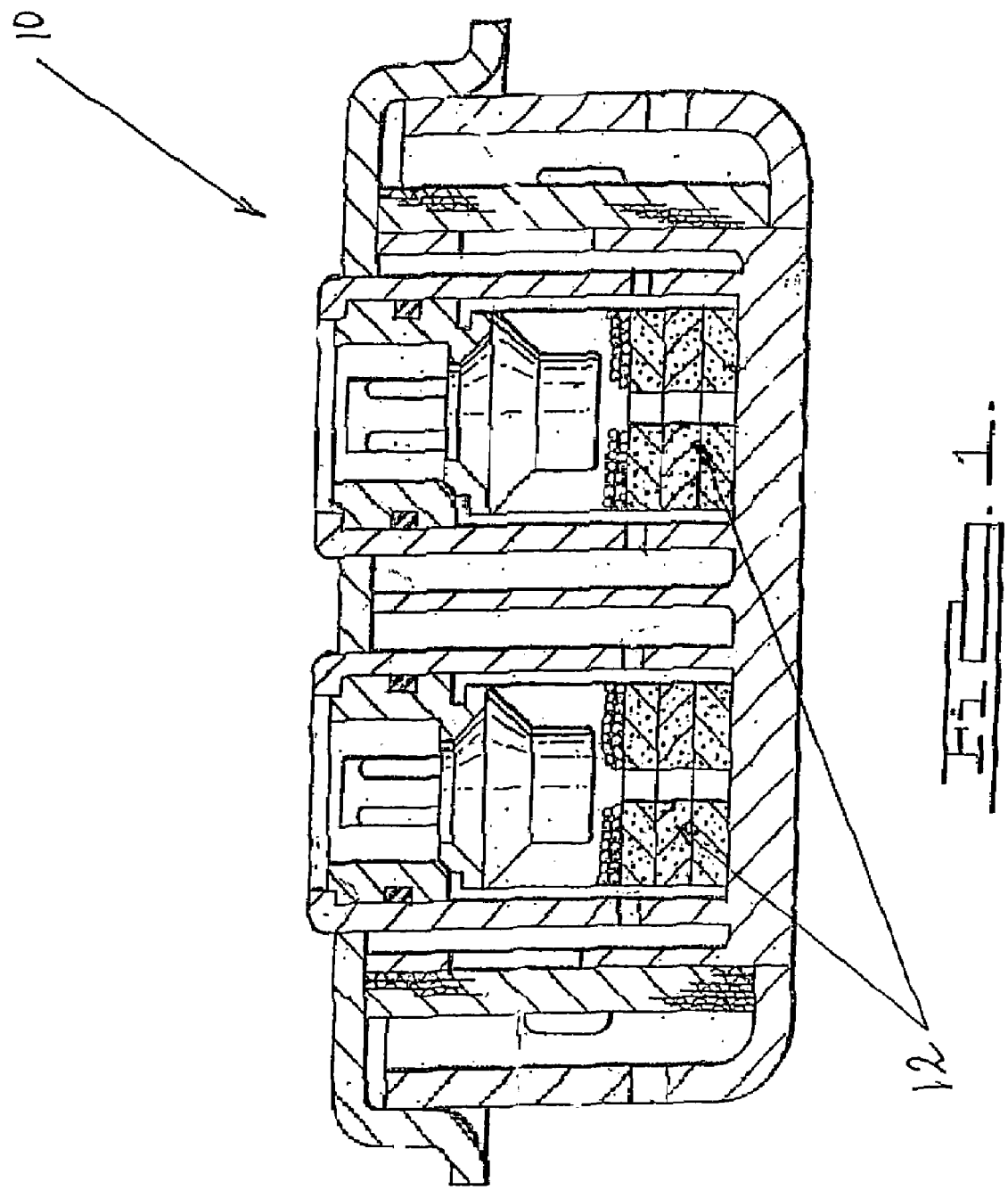
FIG. 1 is an exemplary airbag inflator containing a gas generant composition formed in accordance with the present invention.

In accordance with the present invention, a water-based synthesis has been developed for the synthesis of a polymeric fuel or constituent, useful in gas generating compositions for example.

The synthesis is begun by dissolving at least one azide salt, at least one surfactant, and water at room temperature by slowly mixing the three constituents together to form a homogeneous mixture within a mixing vessel. A blender may be used at a slow speed when premixing these three constituents. At least one reactant polymer, in powdered form, is then mixed into the homogenous mixture, and stirred rapidly, or blended rapidly at a high speed to form an homogeneous emulsion. When properly mixed, the emulsion or dispersion will look like milk. The mixture is then heated to 100° C. to 200° C. and the temperature maintained for a desired period of time. The elevated temperature is preferably maintained for a period of twenty-four to seventy-two hours. It has been found that heating at 24 hours provides a percent yield of about 40%. On the other hand, longer periods of heating indicate improved yields.

The binder/fuel produced by the present procedure may be employed in gas generant compositions and mixed with at least one oxidizer, and, if desired at least one secondary fuel and other known constituents useful in gas generant compositions, particularly those used in vehicle occupant protection systems.

One or more reactive polymeric compounds having a nitrile group or cyano (nitrile) functionality may be selected from polycyanoacrylates; polyhaloacrylonitriles where the halogen may be fluorene, chlorine, bromine, or iodine; polytriallyl cyanurates, cellulose cyanoethyl ethers; and polymethacrylonitriles. Other nitrile-containing compounds contemplated include any oligomer, co-polymers or block co-polymers or blends thereof containing nitrile functionality such as poly butadiene/acrylonitriles and polystyrene/acrylonitriles, and mixtures thereof. The nitrile-containing polymers may be obtained, for example, from Polysciences, Inc. at www.polysciences.com. The molecular weight of the reactive nitrile-containing polymer or oligomer may range from a few thousand Daltons to about a million. In general, it is believed that once a polymer attains a 20,000-30,000 molecular weight range, for most polymers the material properties (rheology) do not materially change. Most commercial sources for polyacrylonitrile contain polymers having a molecular weight of about 150,000 Daltons. The molarity of the reactive polymer in water preferably ranges from about 0.5 to 1.5.

One or more azide salts may be selected from organic and inorganic salts. Exemplary azide salts include ammonium azide, potassium azide, and trimethylsilyl azide.

One or more surfactants may be selected from phase transfer catalysts such as quaternary ammonium salts, lauryl sulfates such as sodium lauryl sulfate, ammonium lauryl sulfate, hand soap such as Dial®, dish detergent such as Dawn® detergent, other functional surfactants, and mixtures thereof.

One or more catalytic reagents may be selected from zinc-containing compounds including zinc bromide, zinc chloride, and zinc bromide dihydrate. The catalytic reagent is added in catalytic effective amounts, determined for example on an iterative basis. In general, the catalytic reagent will function as a Lewis Acid and may be purchased from known suppliers such as Aldrich Chemical Company.

Referring again to FIGS. 1 and 2, a gas generant composition 12 is contained within inflator 10 and is manufactured as known in the art. It will be appreciated that a gas generant composition 12 will contain a polymeric fuel, binder, and/or constituent as provided from the synthesis described above. The gas generant composition 12 may further include any gas generant known to be useful in the art. Preferable gas generant compositions may, for example, be in pelletized form and include but are not limited by those described in co-owned U.S. Pat. Nos. 5,035,757; 5,872,329 and 6,210,505 the teachings of which are incorporated herein by reference. It will be appreciated that the fuel constituent of any of these gas generant compositions may be augmented or supplanted as per design criteria by the polymeric tetrazole constituents formed in accordance with the present invention. Further, the polymeric tetrazole constituents formed in accordance with the present invention may be integrated into any of the exemplary compositions described, or any other composition useful as a gas generant, in accordance with known propellant manufacturing techniques.

U.S. Pat. No. 5,037,757 discloses azide-free gas generants including tetrazole compounds such as aminotetrazole, tetrazole, bitetrazole and metal salts of these compounds, as well as triazole compounds such as 1,2,4-triazole-5-one or 3-nitro 1,2,4-triazole-5-one and metal salts of these compounds. Certain metal salts (alkaline earth metals) of these compounds can function, at least in part, as high temperature slag formers. For example, the calcium salt of tetrazole or bitetrazole forms, upon combustion, calcium oxide which would function as a high-temperature slag former. Magnesium, strontium, barium and possibly cerium salts would act in similar manner. In combination with a low-temperature slag former, a filterable slag would be formed. The alkali metal salts (lithium, sodium, potassium) could be considered, at least in part, as low-temperature slag formers since they could yield lower melting silicates or carbonates upon combustion.

Oxidizers generally supply all or most of the oxygen present in the system. In addition, however, they are the preferred method of including a high-temperature slag former into the reaction system. The alkaline earth and cerium nitrates are all oxidizers with high-temperature slag forming potential, although most of these salts are hygroscopic and are difficult to use effectively. Strontium and barium nitrates are easy to obtain in the anhydrous state and are excellent oxidizers. Other alkaline earth and alkali metal nitrates, chlorates and perchlorates are other useful oxidizers when combined with a high-temperature slag former.

Materials which function as high-temperature slag formers have melting points at, or higher, than the combustion temperature or decompose into compounds which have melting points, at or higher, than the combustion temperature. The alkaline earth oxides, hydroxides and oxalates are useful high-temperature slag formers. Magnesium carbonate and magnesium hydroxide are very useful high-temperature slag formers because they decompose before melting to form magnesium oxide which has a very high melting point (2800° C.). As mentioned above, oxidizers such as strontium nitrate are especially beneficial since they serve both as high-temperature slag former and oxidizer, thereby increasing the amount of gas produced per unit weight.

Metal salts as fuels, such as the calcium or strontium salt of 5-aminotetrazole, tetrazole, or ditetrazole are also useful high-temperature slag formers, although not as efficient as the oxidizers. Other metal oxides having high melting points such as the oxides of titanium, zirconium and cerium are also useful high-temperature slag formers.

Materials which function as low-temperature slag formers have melting points at or below the combustion temperature or form compounds during combustion which have melting points at or below the combustion temperature. Compounds such as silicon dioxide ($SiO_2$), boric oxide ($B_2O_3$), vanadium pentoxide ($V_2O_5$), sodium silicate ($Na_2SiO_3$), potassium silicate ($K_2SiO_3$), sodium carbonate ($Na_2CO_3$) and potassium carbonate ($K_2CO_3$) are examples of low-temperature slag formers.

Set in the above context, an exemplary pyrotechnic, slag forming gas generating mixture may comprise at least one each of the following materials.

a. A fuel selected from a polymeric tetrazole synthesized by the water-based method described above, and if desired, a secondary fuel selected from the group of tetrazole compounds including aminotetrazole, tetrazole, bitetrazole and metal salts of these compounds as well as triazole compounds and metal salts of triazole compounds.

b. An oxygen containing oxidizer compound selected from the group including alkali metal, alkaline earth metal, lanthanide and ammonium nitrates and perchlorates or from the group including alkali metal or alkaline earth metal chlorates or peroxides.

c. A high temperature slag forming material selected from the group including alkaline earth metal or transition metal oxides, hydroxides, carbonates, oxalates, peroxides, nitrates, chlorates and perchlorates or from the group including alkaline earth metal salts of tetrazoles, bitetrazoles and triazoles.

d. A low-temperature slag forming material selected from the group including silicon dioxide, boric oxide and vanadium pentoxide or from the group including alkali metal silicates, borates, carbonates, nitrates, perchlorates or chlorates or from the group including alkali metal salts of tetrazoles, bitetrazoles and triazoles or from the group including the various naturally occurring clays, micas, and talcs.

U.S. Pat. No. 5,872,329 discloses nonazide gas generants for a vehicle passenger restraint system employing ammonium nitrate as an oxidizer and potassium nitrate as an ammonium nitrate phase stabilizer. The fuel, in combination with phase stabilized ammonium nitrate, in addition to the polymeric tetrazole formed by the water-based synthesis described above, may be selected from the group including amine salts of tetrazoles and triazoles having a cationic amine component and an anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic amine component is selected from an amine group including ammonia, hydrazine, guanidine compounds such as guanidine, aminoguanidine, diaminoguanidine, triaminoguanidine, dicyandiamide, nitroguanidine, nitrogen substituted carbonyl compounds such as urea, carbohydrazide, oxamide, oxamic hydrazide, bis-(carbonamide) amine, azodicarbonamide, and hydrazodicarbonamide, and amino azoles such as 3-amino-1,2,4-triazole, 3-amino-5-nitro-1,2,4-triazole, 5-aminotetrazole and 5-nitraminotetrazole. Optional inert additives such as clay or silica may be used as a binder, slag former, coolant or processing aid. Optional ignition aids comprised of nonazide propellants may also be utilized in place of conventional ignition aids such as $BKNO_3$. The gas generants are prepared by dry blending and compaction of the comminuted ingredients.

Other high nitrogen nonazides that may be employed as primary fuels in gas generant compositions include, in particular, amine salts of tetrazole and triazole selected from the group including monoguanidinium salt of 5,5'-Bis-1H-tetrazole (BHT.1GAD), diguanidinium salt of 5,5'-Bis-1H-tetrazole (BHT.2GAD), monoaminoguanidinium salt of 5,5'-Bis-1H-tetrazole (BHT.1AGAD), diaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1NH.sub.3), diammonium salt of 5,5'-bis-1H-tetrazole ($BHT.2NH_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), diguanidinium salt of 5,5'-Azobis-1H-tetrazole (ABHT-2GAD), and monoammonium salt of 5-Nitramino-1H-tetrazole ($NAT-1NH_3$). The nonazide fuel generally comprises 15-65%, and preferably comprises 20-55%, by weight of the total gas generant composition.

The foregoing amine salts of tetrazole or triazole may be dry-mixed with phase stabilized ammonium nitrate, for example, thereby minimizing the overall amount of solids produced upon combustion. With regard to the compositions of U.S. Pat. No. 5,872,329, the oxidizer may be generally employed in a concentration of about 35 to 85% by weight of the total gas generant composition. The ammonium nitrate may be stabilized by potassium nitrate, as taught in co-owned U.S. Pat. No. 5,531,941, entitled, "Process For Preparing Azide-Free Gas Generant Composition", and granted on Jul. 2, 1996, incorporated herein by reference. The PSAN comprises 85-90% AN and 10-15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

If a slag former, binder, processing aid, or coolant is desired, inert components such as clay, diatomaceous earth, alumina, or silica are provided in a concentration of 0.1-10% of the gas generant composition, wherein toxic effluents generated upon combustion are minimized.

Accordingly, a gas generant composition, formed in accordance with the present invention, typically may include about 20-60% by weight of a fuel, about 40-80% by weight of an oxidizer, and other constituents that are optionally included in the aggregate at about 0 to 20% by weight.

It will be appreciated that the various constituents described in the water-based synthesis may be obtained from well known suppliers or from well known processes. The polymer containing the nitrile group, such as poly(acrylonitrile), may be obtained from Polysciences, Inc. of Pennsylvania, for example. Aldrich Chemical Co. of Milwaukee, Wis. may also provide the reactive polymer, the azide salt, and the ammonium chloride. The surfactant, such as ammonium lauryl sulfate may be provided by Rhodia Chemical Co. of Chicago, Ill.

EXAMPLE

Water-based Synthesis of Poly (5-vinyltetrazole)

The method or order of mixing the reaction constituents is not critical. A reaction vessel is provided including a heat means such as an inductive coil, and a stirring means such as a rotor. Other heat and stirring means may be provided as desired. One molar equivalent of polyacrylonitrile (Polysciences, Inc), 1.1 molar equivalents of sodium azide (Aldrich), 0.5 molar equivalents of zinc bromide dihydrate (Aldrich), and about 0.0025 molar equivalents of ammonium lauryl sulfate as a 28 wt % of water (Rhodia) are added to the reaction vessel. The final molarity of polymer in the water is about one. An exemplary batch employs about 47.7 grams of polymer, 64.29 grams of azide salt, 117.41 grams of zinc bromide dehydrate, 2.25 ml surfactant, and 900 ml water. The molar ratios may vary so long as an excess of the azide salt is employed and at least 0.5 molar equivalents of zinc is employed. The amount of surfactant can also be varied with no more than 0.1 equivalents and no less than 0.000001 molar equivalents. The amount of water may vary, and may be typically found at about 0.1 to 5 molar equivalents solution.

In general, all constituents are added to the reaction vessel, mixed, and sealed inside. The mixture is preferably continually stirred and heated, preferably to about 170C, at a pressure ranging from about 80-100 psi.

The mixture was then left to react for preferably between 12-48 hours while maintaining the temperature. In the present case, the mixture was left to react for about 24 hours, and then cooled to room temperature. The milky contents were then filtered in a buchner funnel and washed with an equal volume of water. Next, the contents were dispersed in 3.0 L (between 1.0-10.0 L) of cold water (between 0.1-24C) and rapidly stirred. Acid such as HCl, $H_2SO_4$, or $HNO_3$ is then added to adjust the pH of the suspension between 1-3 and the mixture was then continually stirred for about 20 minutes.

The suspension was then filtered again in a buchner funnel using a nylon screen and washed with an equivalent amount of water. A rubbery wet material remained in the funnel that was then removed and cut into relatively small pieces using standard scissors. The material was then suspended in about 1.0 L of water and excess (at least one molar equivalent)

ammonium hydroxide (Aldrich) was added to the suspension while stirring the suspension. The suspension slowly dissolved and as heat (about 25-100C) was applied, the dissolution rate increased. The mixture became relatively viscous and stirring was stopped. The solution is then poured into a flat pan and air dried to remove excess ammonia. After that the material was dried further in an oven, and then ball-milled to a fine dust. After the addition of ammonium hydroxide, the product was completely reacted and all other steps involved drying and processing the material. Infrared analysis and elemental analysis indicate the product to be poly (5-vinyltetrazole).

It should be appreciated that the method described in Example 1 exemplifies a general synthesis wherein any polymer having cyano or nitrile functionality may be employed with equivalent compounds in equivalent molar amounts, thereby resulting in a polymeric vinyl tetrazole substituted on the 5-position of the tetrazole ring.

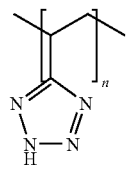

Poly(5-vinyl) tetrazole

In general, the method of forming a vinylated tetrazole substituted at the 5-position includes the following steps, as explained in more detail above:

1. providing a reaction vessel;
2. adding water, at least one azide salt, at least one surfactant, at least one zinc-containing compound, and at least one polymer containing cyano or nitrile functionality to the reaction vessel, wherein the order of adding the water, the azide salt, the surfactant, the zinc-containing compound, and the polymer to the reactant vessel may be varied;
3. mixing the contents of the reaction vessel into a liquid mixture to react the mixture;
4. washing and filtering the contents of the reaction vessel to produce a filtrate/water mixture;
5. acidifying the filtrate/water mixture to a pH of about 1-3 and stirring the same;
6. filtering the acidified filtrate/water mixture to separate a solid from the acidified filtrate/water mixture;
7. suspending the solid in water and adding an excess amount of a base such as ammonium hydroxide to the suspension while stirring the same;
8. dissolving the solid in the base/water mixture to form a slurry; and
9. pouring the slurry into a container and drying the slurry to form a final solid.

Figure 2:
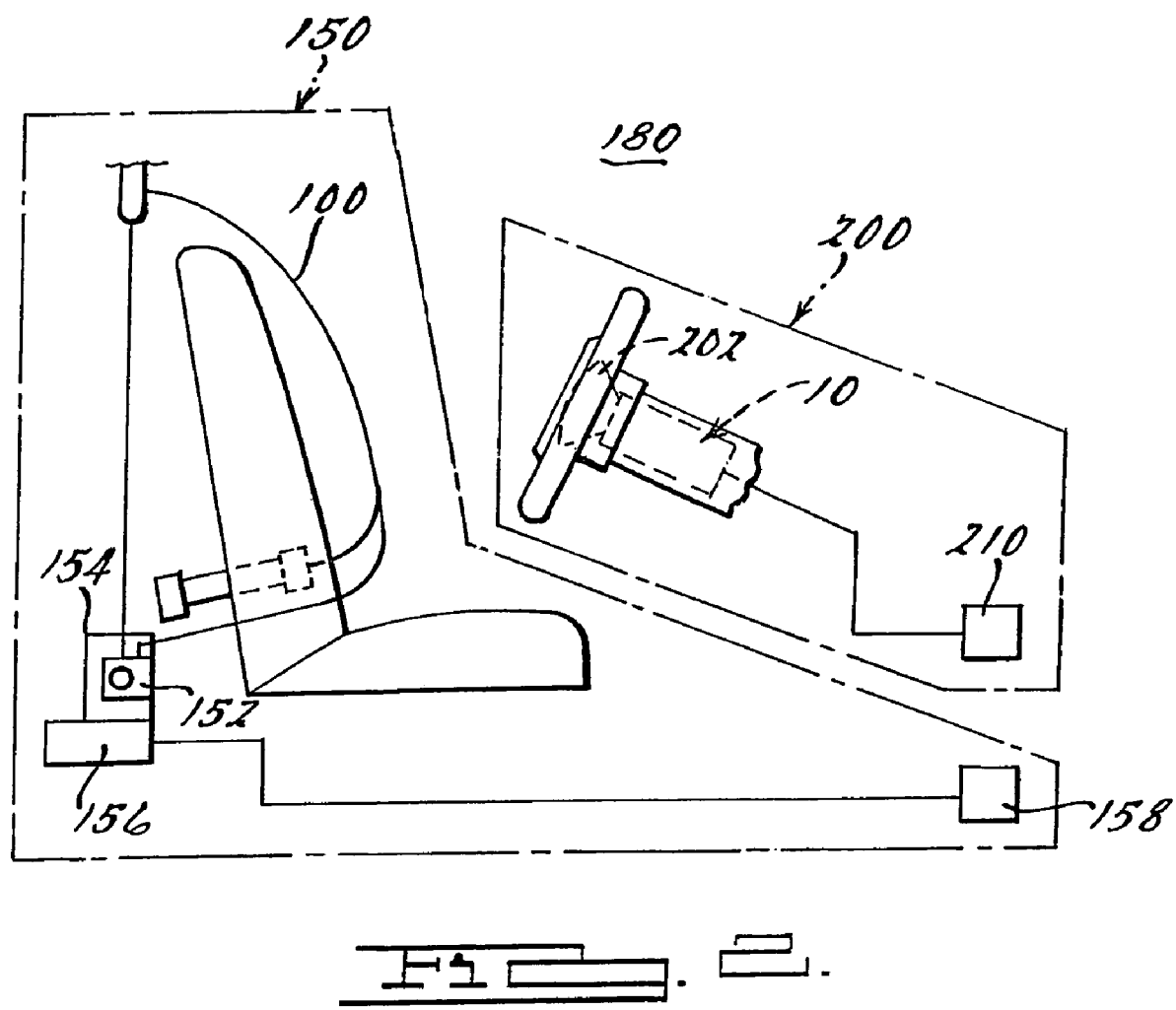
FIG. 2 is a schematic representation of an exemplary vehicle occupant restraint system incorporating the inflator of FIG. 1 and a gas generant in accordance with the present invention.

In yet another aspect of the invention, present compositions containing a fuel, binder, and/or constituent formed as exemplified herein may be employed within a gas generating system. For example, as schematically shown in FIG. 2, a vehicle occupant protection system made in a known way contains crash sensors in electrical communication with an airbag inflator in the steering wheel, and also with a seatbelt assembly. The polymeric gas generating fuel/binder or constituent formed from the water-based method of the present invention is incorporated within a gas generant composition as known in the art. Gas generant compositions of the present invention may be employed in both subassemblies within the broader vehicle occupant protection system or gas generating system. More specifically, each gas generator employed in an automotive gas generating system may contain a gas generating composition as described herein.

As shown in FIG. 1, an exemplary inflator incorporates a dual chamber design to tailor the force of deployment an associated airbag. In general, an inflator containing a gas generant 12 formed as described herein may be manufactured as known in the art. U.S. Pat. Nos. 6,422,601, 6,805,377, 6,659,500, 6,749,219, and 6,752,421 exemplify typical airbag inflator designs and are each incorporated herein by reference in their entirety. It designs and are each incorporated herein by reference in their entirety. It will be appreciated that gas generant 12 contains among other constituents a polymeric tetrazole, poly(5-vinyltetrazole) formed by the water-based method of the present invention. The resulting inflator is less costly and easier to manufacture for the reasons and advantages stated above relative to the method of making the water-based poly(5-vinyltetrazole).

Referring now to FIG. 2, the exemplary inflator 10 described above may also be incorporated into an airbag system 200. Gas generating or airbag system 200 includes at least one airbag 202 and an inflator 10 containing a gas generant composition 12 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 2, airbag system 200 may also be incorporated into a broader, more comprehensive vehicle occupant restraint system 180 including additional elements such as a safety belt assembly 150. FIG. 2 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 containing propellant 12 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553, 803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit gas generating systems contemplated in accordance with the present invention.

It will be understood that the foregoing descriptions of various embodiments of the present invention are for illustrative purposes only, and should not be construed to limit the breadth of the present invention in any way. As such, the various structural and operational features disclosed herein are susceptible to a number of modifications, none of which departs from the scope of the present invention as defined in the appended claims.

What is claimed is:

1. A method of forming a poly (5-vinyl)tetrazole, the method including the steps of:
    providing a reaction vessel;
    adding water to the reaction vessel;
    adding at least one aide salt to the reaction vessel;
    adding at least one surfactant to the reaction vessel;
    adding a polyacrylonitrile polymer to the reaction vessel, wherein the order of adding the water, azide salt, surfactant and the polyacrylonitrile polymer to the reactant vessel may be varied;
    mixing the contents of the reaction vessel into a liquid aqueous mixture void of organic solvent;
    heating the contents of the reaction vessel consisting of the liquid aqueous mixture, thereby reacting the contents of the reaction vessel;
    cooling the contents of the reaction vessel;
    filtering the contents of the reaction vessel to produce a filtrate;
    washing the filtrate with water to produce a filtrate/water mixture;
    acidifying the filtrate/water mixture to a pH of about 1-3 and stirring the same, to form an acidified filtrate/water mixture;
    filtering the acidified filtrate/water mixture to separate a solid from the acidified filtrate/water mixture;
    suspending the solid in water and adding an excess amount of a base to the suspension while stirring the same;
    dissolving the solid in the base/water mixture to form a slurry; and
    pouring the slurry into a container and drying the slurry to form the poly(5-vinyltetrazole).

2. The method of claim 1 wherein the step of heating the contents of the reaction vessel includes heating the slurry to a temperature ranging from about 100-200C.

3. The method of claim 2 wherein the slurry is heated to about 170C.

4. The method of claim 1 wherein the water is added at about 0.5 to about 5 molar equivalents, the azide salt is added at about 0.5 to 1.5 molar equivalents, the surfactant is added in a catalytic amount, the catalytic reagent is added at about 0.5 to 1.5 molar equivalents, and the polyacrylonitrile is added at about 0.5 to 1.5 molar equivalents.

5. The method of claim 1 wherein dissolving the solid within the base includes heating the water and the suspended solid to form a slurry, the slurry heated to about 25 to 100C.

6. The method of claim 1 further containing the step of grinding the poly(5-vinyltetrazole) to a fine powder.

7. The method of claim 1 wherein the contents of the reaction vessel are permitted to react for about 12 to 48 hours prior to cooling.

8. The method of claim 1 wherein the azide salt is selected from organic and inorganic azide salts.

9. The method of claim 8 wherein the azide salt is selected from ammonium azide, potassium azide, and trimethylsilyl azide.

10. The method of claim 1 wherein the surfactant is selected from quaternary ammonium salts, lauryl sulfates, hand soaps, dish soaps, and mixtures thereof.

11. The method of claim 1 wherein the azide salt is about 1.1 molar equivalents of sodium azide, the surfactant is about 0.0025 molar equivalents of sodium lauryl sulfate, the polyacrylonitrile polymer is provided at about 1.0 molar equivalents and the catalytic reagent is about 0.5 molar equivalents of zinc bromide dihydrate.

12. A method of forming a vinylated tetrazole substituted at the 5-position, the method including the steps of:
    providing a reaction vessel;
    adding water, at least one azide salt, at least one surfactant, at least one zinc-containing compound, and at least one polymer containing cyano or nitrile functionality to the reaction vessel, wherein the order of adding the water, the azide salt, the surfactant, the zinc-containing compound, and the polymer to the reactant vessel may be varied;
    mixing the contents of the reaction vessel into a liquid mixture to react the mixture;
    washing and filtering the contents of the reaction vessel to produce a filtrate/water mixture;
    acidifying the filtrate/water mixture to a pH of about 1-3 and stirring the same;
    filtering the acidified filtrate/water mixture to separate a solid from the acidified filtrate/water mixture;
    suspending the solid in water and adding an excess amount of a base to the suspension while stirring the same;
    dissolving the solid in the base/water mixture to form a slurry; and
    pouring the slurry into a container and drying the slurry to form the poly(5-vinyltetrazole).

13. The method of claim 12 wherein the base is ammonium hydroxide.

14. A method of forming a poly(5-vinyl)tetrazole, the method including the steps of:
    providing a reaction vessel;
    adding water to the reaction vessel;
    adding at least one azide salt to the reaction vessel;
    adding at least one surfactant to the reaction vessel;
    adding polyacrylonitrile to the reaction vessel, wherein the order of adding the water, azide salt, surfactant, and polyacrylonitrile to the reactant vessel may be varied;
    mixing the contents of the reaction vessel into a liquid aqueous mixture void of organic solvent;
    heating the contents of the reaction vessel consisting of the aqueous mixture, thereby reacting the contents of the reaction vessel;
    cooling the contents of the reaction vessel;
    filtering the contents of the reaction vessel to produce a filtrate;
    washing the filtrate with water to produce a filtrate/water mixture;
    dispersing the filtrate/water mixture into cold water and stirring the same;
    acidifying the filtrate/water mixture to a pH of about 1-3 and stirring the same;
    filtering the acidified filtrate/water mixture to separate a solid from the acidified filtrate/water mixture;
    suspending the solid in water and adding an excess amount of ammonium hydroxide to the suspension while stirring the same, thereby forming a base/water mixture;
    dissolving the solid in the base/water mixture to form a slurry; and
    pouring the slurry into a container and drying the slurry to form the poly(5-vinyltetrazole.

* * * * *

UNITED STATES PATENT AND TRADEMARK OFFICE
CERTIFICATE OF CORRECTION

PATENT NO. : 7,667,045 B2  Page 1 of 1
APPLICATION NO. : 11/143198
DATED : February 23, 2010
INVENTOR(S) : Miller et al.

It is certified that error appears in the above-identified patent and that said Letters Patent is hereby corrected as shown below:

Column 9; claim 1; line 12; delete "aide" and insert --azide--

Signed and Sealed this

Fifth Day of October, 2010

David J. Kappos
*Director of the United States Patent and Trademark Office*